United States Patent [19]

Capovilla

[11] Patent Number: 4,480,389
[45] Date of Patent: Nov. 6, 1984

[54] WHEEL ALIGNMENT SYSTEM

[76] Inventor: Ralph Capovilla, 4 Hamilton Pl., Pine Brook, N.J. 07058

[21] Appl. No.: 512,903

[22] Filed: Jul. 11, 1983

[51] Int. Cl.³ .............................................. G01B 5/255
[52] U.S. Cl. ................................ 33/203.12; 33/203.14
[58] Field of Search ............ 33/203.14, 203.13, 203.12, 33/203

[56] References Cited

U.S. PATENT DOCUMENTS 2,087,909  7/1937  Haucke .............................. 33/203.12
2,720,036  10/1955  Berger ................................ 33/203.12

Primary Examiner—Harry N. Haroian
Attorney, Agent, or Firm—W. Patrick Quast

[57] ABSTRACT

An improved wheel alignment system primarily used with unibody frame straightening fixtures, including a frame bed having a pair of longitudinally extending members and bed plates, upon which rest the drive wheels of the vehicle. The improved system includes two base plates which are suspended from the longitudinally extending members so that the top surface of each is positioned a prescribed distance in relationship to the plane of the frame bed. In aligning the front wheels of a rear wheel drive vehicle, a wheel alignment tool is positioned on the top surface of the base plate and the front wheels of the vehicle lowered thereon. The prescribed distance of the top surface of the base plate below the plane of the frame bed is such that the top surface of the bed plate (support plate for the rear wheels in this case) of the unibody system. Adapter plates are employed when aligning the front wheels on a front wheel vehicle. The adapter plates are positioned on the base plates and raise the rear wheels of the vehicle sufficiently such that the top surface of the adapter plate is approximately level with the top surface of the wheel alignment tool which is now positioned on the bed plate where the front wheels are now positioned. Means for fine adjusting the level of the base plate of composite, base plate-adapter plate, are described.

3 Claims, 14 Drawing Figures

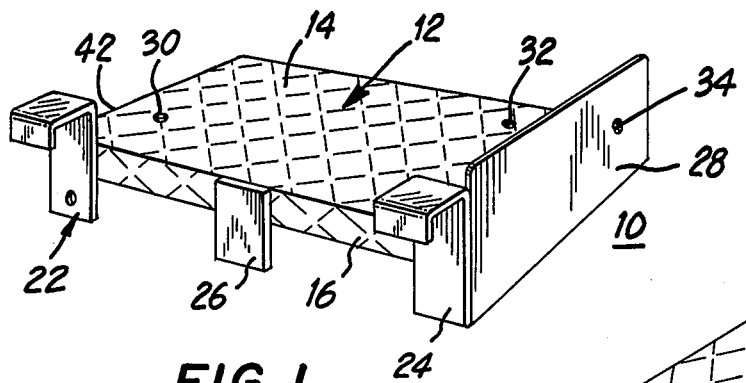
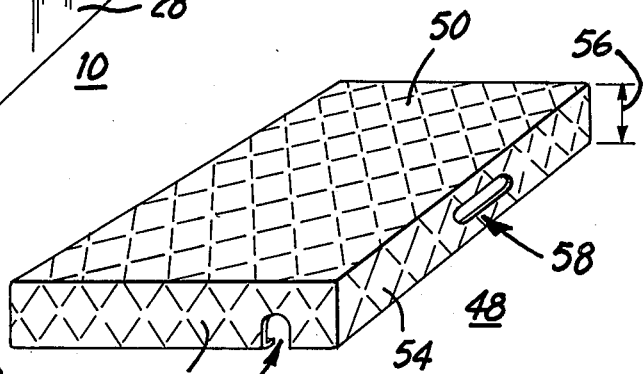
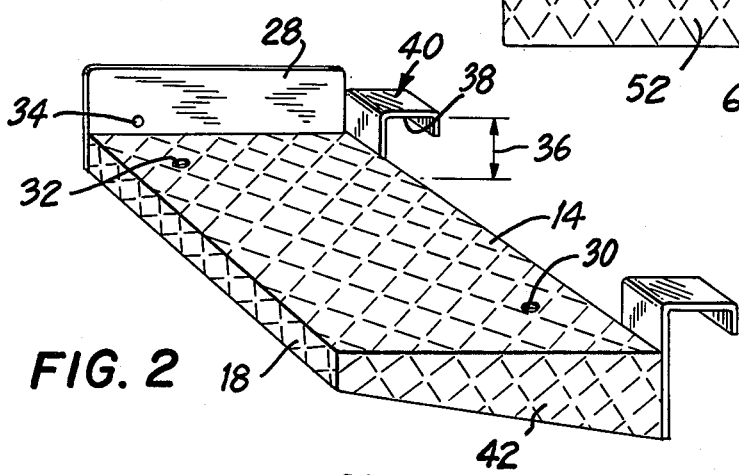
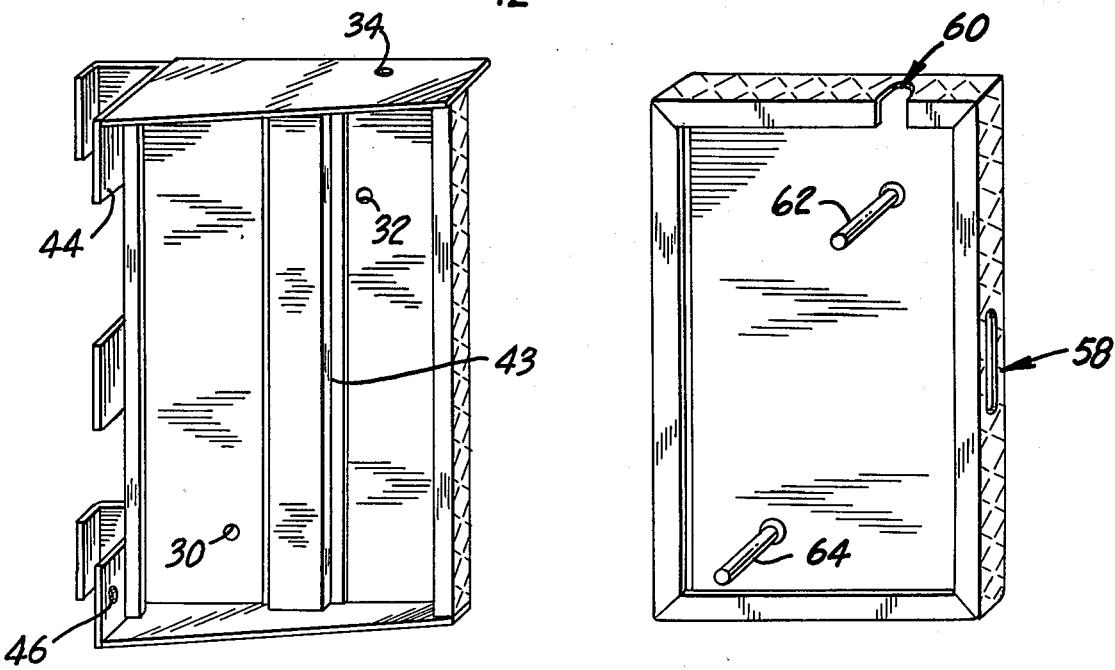
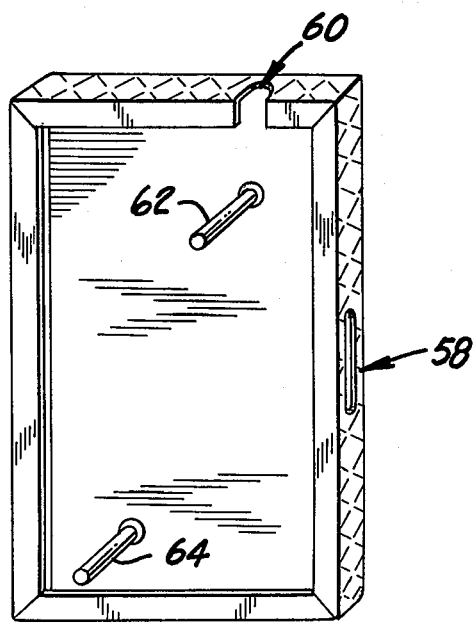

WHEEL ALIGNMENT SYSTEM

TECHNICAL FIELD

This invention relates generally to an alignment tool for setting front wheel alignments on front and rear wheel drive vehicles, and more particularly, to a wheel alignment tool, suitable for use as part of a unibody car repair system.

BACKGROUND

In the past, cars were manufactured having separate frame and body members which were welded, riveted or otherwise connected together to result in the final car body. Today, in America alone, there was well over 30 million domestic and foreign made cars totally different from the permimeter-frame vehicles of the past. These cars are called unibodies because the frame and body are a single unit. They are constructed of very thin metal instead of the heavy steel frames previously used.

The unibody is a design based on new and changing technology which employs different materials—aluminum, plastics, high strength low alloy steels i.e., materials to make cars lighter, and therefore more fuel efficient.

In order to meet this growing trend towards unibody construction, various repair systems have been developed. One such system, the Paulee Universal Auto Body Repair System, is marketed in the United States by the Paulee Equipment Sales, Inc. Company of Los Angeles, Calif. This is a universal bench which can be used for straightening, checking and assembling damaged car bodies, as well as traditional service work including wheel alignment. Similar bench systems exist which provide not only the damaged car body repair capability but also the standard car services.

Another similar bench system is the so called "car bench" system marketed in the United States by Unicar Industries, Inc., 400 Farmingdale Road, West Babylon, N.Y.

In order to adapt the unibody bench to wheel alignment, previous alignment schemes required extremely cumbersome, special bed plate and trolley arrangements which were not only awkward and heavy but also extremely expensive not only in fabrication but as well in installation. Because of their size and extreme weight, they require two men to adapt the system for wheel alignment.

It is therefore a primary object of this invention to provide a wheel alignment adapter system designed especially for bench type unibody systems which is light weight, simple, relatively inexpensive to fabricate, and which requires only one man to install.

DISCLOSURE OF THE INVENTION

Towards the accomplishment of this and other objectives which will become apparent from the following description and accompanying drawings, there is disclosed an improved wheel alignment system for use particularly with a unibody frame straightening bench having longitudinally extending members. The system comprises two base plates which are suspended from respective ones of the longitudinally extending members, such that the top surface of each base plate is located at a prescribed distance below the plane of the universal bench frame bed. For a rear wheel drive vehicle, a standard wheel alignment tool is positioned on each base plate and the vehicle maneuvered such that the free, front wheels are positioned on the top surface of the wheel alignment tool. The prescribed distance of the top surface of the base plate below the top surface of the frame bed is such that when the wheel alignment tool is in place, the vehicle is approximately level. For front wheel drive vehicles, two adapter plates are utilized which are disposed on the base plates raising the rear wheels of the vehicle to a point such that the vehicle is level, with the front drive wheels positioned on the wheel alignment tool. Means are described for fine adjusting the level of the base plate or base plate-adapter plate composite

BRIEF DESCRIPTION OF THE DRAWINGS

A full grasp of the invention, its advantages and benefits will be more readily understood from a reading of the following description taken in conjunction with the accompanying drawings. The latter include:

FIGS. 1, 2 and 3 representing various perspective views of the base plate member of the invention;

FIGS. 4 and 5 representing two different perspective views of the adapter plate of the present invention;

DESCRIPTION OF THE BEST MODE

Figure 6:
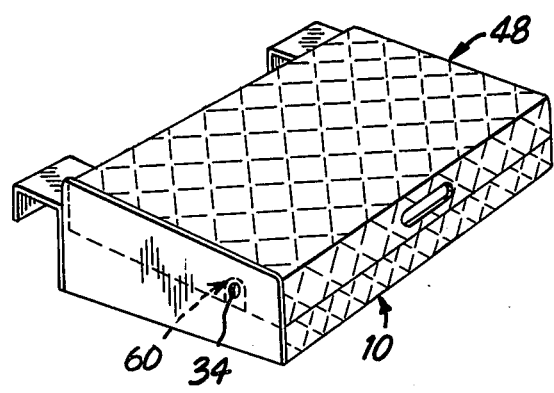
FIGS. 6 and 7 showing two different perspective views of the composite assembly of the adapter plate and base plate.

Referring now to FIG. 1, a base plate 10 is depicted. It includes a plate portion 12 which is fabricated from diamond plate steel which provides a gripping surface 14 for the vehicle tire. The plate portion is strengthened by side edges 16, 18 and 42 which are formed at right angles to the top section and generally welded at the corners. Secured to the side edge 16 of the plate 12 are two formed flanges, 22 and 24 and straight flange member 26. Flanges 22 and 24 are formed so as to provide a means for suspending the plate to the frame members of the universal bench as is more readily seen in FIG. 9 et seq. Welded to the remaining side of the plate 12 is a wheel stop and anchor plate 28 whose function is more readily understood from the explanation below.

Thru holes 30 and 32 are drilled at opposite corners in the plate member 12. Anchor hole 34 is drilled thru the anchor plate 28. Their functions likewise will be explained below.

Referring now particularly to FIG. 2, it is seen that flanges 22 and 24 are configured in a partially rectangular shape. The distance 36 between the top surface 14 of the plate and the undersurface 38 of the section 40 of the flange parallel to the surface 14 is determined in order to provide a level arrangement between the front and rear wheels of the vehicle to assure accuracy in the alignment procedure. The determinant in arriving at this critical distance 36 will be understood, again, after the discussion below.

Side panel 42 is depicted as wedge-shaped as is its oppositely disposed counterpart hidden by anchor plate 28. This provides strength to the base plate assembly.

Referring to FIG. 3, positioned underneath the surface 12 is a support brace channel 43. This provides added strength if required. From this view and FIG. 1, positioned in the downward extending section 44 of one of the flange members is a, preferably, threaded hole 46. This accepts a leveling bolt which coacts with the frame member of the bench to fine adjust the leveling of the plate apparatus.

Referring to FIG. 4, the adapter plate 48 is depicted. It likewise includes a diamond plate top surface 50 and flanged surfaces 52, 54 and their oppositely disposed, parallel surfaces all formed at the same right angle to the top surface 50. These, again, provide strength to the box-shaped adapter plate. The distance 56 is likewise prescribed to achieve a coarse level between the front and rear wheel of vehicle as described hereinafter. Cut through side wall 54 is a gripping cutout 58. A similar cutout not shown is disposed in the opposite side wall to 54. These cutouts enable the operator to easily lift the adapter plate 48 and position it as required.

Side 52 includes an arcuate cutout 60. This is a bolt head clearance hole which enables the bolt to be threaded through the anchor hole 34, anchroing the composite plate assembly to the universal bench trolley to be employed while avoiding an interference problem between the adapter plate 18 and the bolt head.

As viewed from its underside in FIG. 5, adapter plate 48 includes two guide pins 62 and 64 which are welded to the undersurface. These are located in relationship to each other at a distance identical to the distance between guide holes 30 and 32 in top plate surface 14 of the base plate.

Figure 7:
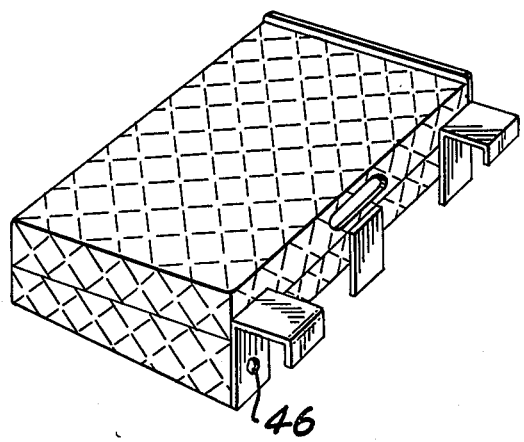

As will be seen hereinafter, the base plate 10 in certain applications will be used independently; and in others it will work with the adapter plate to provide a coarse degree of level between the front and rear wheels. FIGS. 6 and 7 in two different perspective views reflect the composite assembly of the base plate 10 and adapter plate 48.

Figure 8:
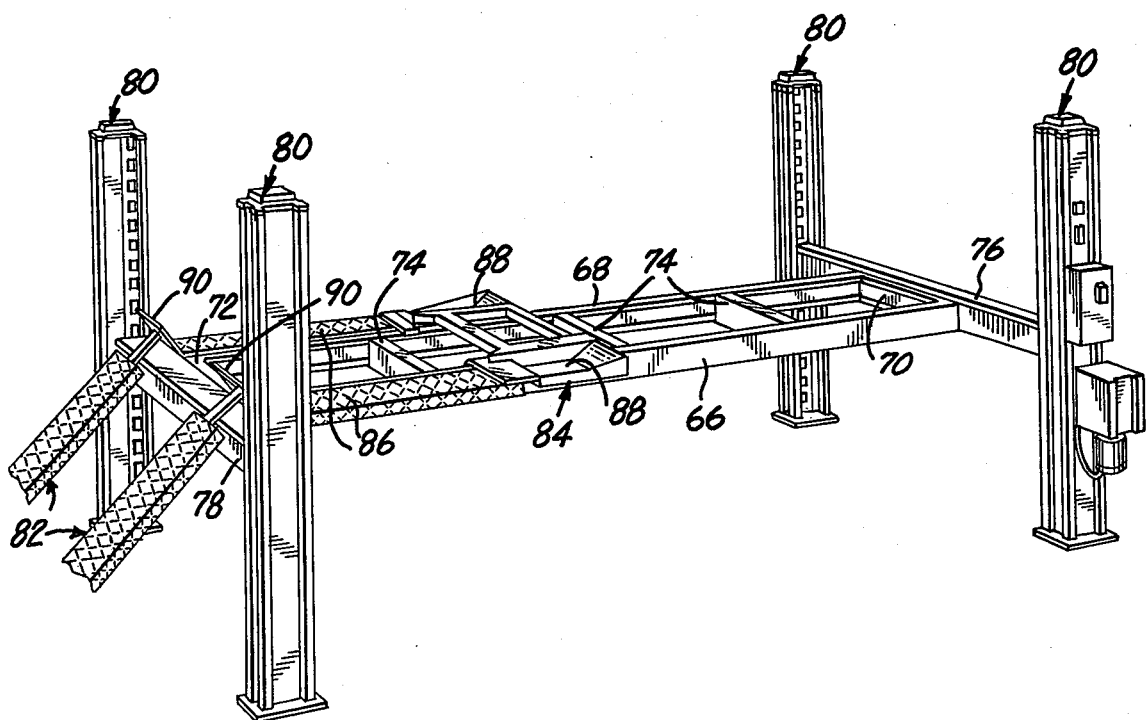
FIG. 8 showing in persepctive view, a typical universal bench system which can employ the wheel alignment system of the present invention.

FIG. 8 depicts a typical universal bench system, for example, the Paulee Universal Bench System, UB-3000. The portions of the bench system that are relevant for the purposes of the present discussion include two longitudinally extending members 66 and 68 which form a basic rectangular bed from with cross members 70 and 72. Additional cross members 74 span the distance between the members 16 and 68 to provide strength. This basic rectangular channel frame is secured to cross members 76 and 79 which arre connected to means for raising and lowering the frame member, which means are disposed in the bench towers 80. Ramps 82 provide means for positioning the vehicle on the frame section of the bench. A trolley 84, shown in FIG. 8 as positioned approximately midway on the frame.

The trolley includes wheel troughs 88 which accept the free wheels of the vehicle as the drive wheels propel the vehicle onto the bench. As the vehicle continues to be driven, the trolley moves towards the right as viewed in FIG. 8 until the drive wheels of the vehicle are located on the top surface of bed plates 86.

Kick plates 90 are eventually disposed so as to prevent rearward movement of the vehicle during servicing procedures.

Figure 9:
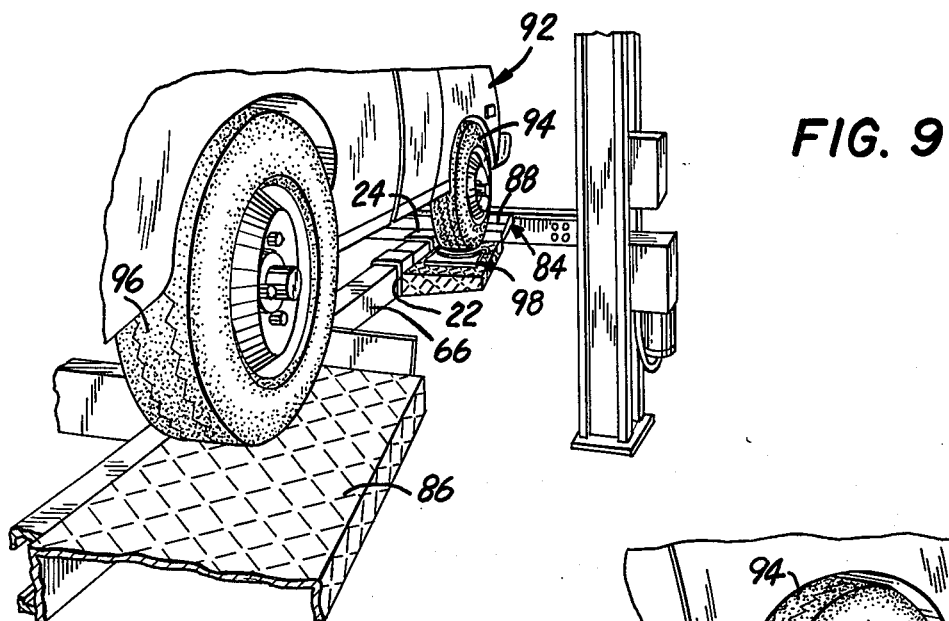
FIGS. 9, 10 and 11 showing utilization of the present invention with rear wheel drive vehicles; and, FIGS. 12, 13 and 14 showing utiization of the wheel alignment system of the present invention with front wheel drive vehicles.
Figure 10:
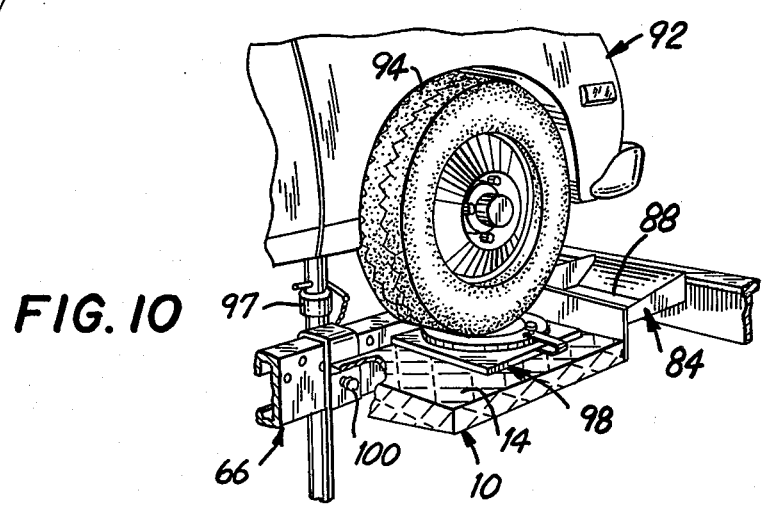
Figure 11:
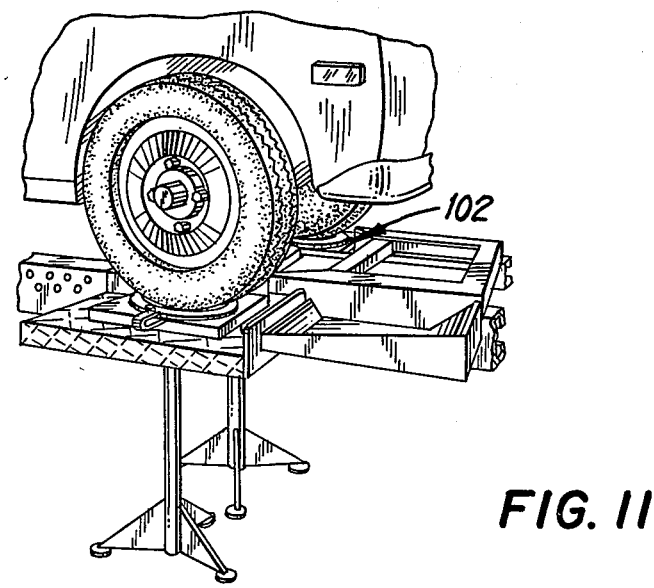

FIGS. 9, 10 and 11 depict the utilization of the base-adapter plate combination together with the universal bench to align the front wheels on a rear wheel drive vehicles. As described earlier the vehicle 42 is driven up onto the frame member portion of the universal bench. The front wheels 94 are positioned in the troughs of the trolley and the vehicle, still driven, moves completely in to the bench.

The drive wheels in this case, 96, eventually are positioned on the rear bed plates 86 and the kick plates raised in their safety position, jacks such as 97 are positioned under the frame members in the front of the vehicle. The frame portion of the universal bench is then lowered and the front wheels alight from the troughs 88 of the trolley. The trolley 84 is moved further forward, out from under the front wheel. Base plate 10 is next positioned under the wheels and secured to the longitudinally extended members 66 and 68 by draping the flanged members, 14 over them. The anchor bolt can be inserted through the hole 34 in the anchor plate 28 and a properly aligned hole in the trolley. A nut is applied to make it secure.

At this point, the bench frame is raised until the vehicle wheel 64 contacts the operating surface of the alignment tool 68. The car is approximately level at this point. Leveling bolt 100 can then be screwed in or out of the threaded hole 26 on the flange, leveling for further adjustment if necessary. A lock nut not shown at this point can be threaded down the alignment screw 100 to contact the cooperating flange surface to prevent the screw 100 from backing off.

As discussed earlier, the critical distance 36 between the top surface 14 of the plate 10 and the undersurface 38 of the flange is determined based on the height of the alignment tool when positioned on the surface 14 of the plate 10 in order that the top operating surface of the alignment tool is at the same, approximate level as the top surface of the bed plate 56. Again, the leveling screw 100 can be used to further adjust and fine tune leveling of the plate 10.

Of course, a similar assembly and procedure as just described would occur with respect to the other front wheel as depicted in FIG. 11 showing alignment tool 102 under the left front wheel. The wheel alignment procedure is then done and the process reversed once complete.

Figure 12:
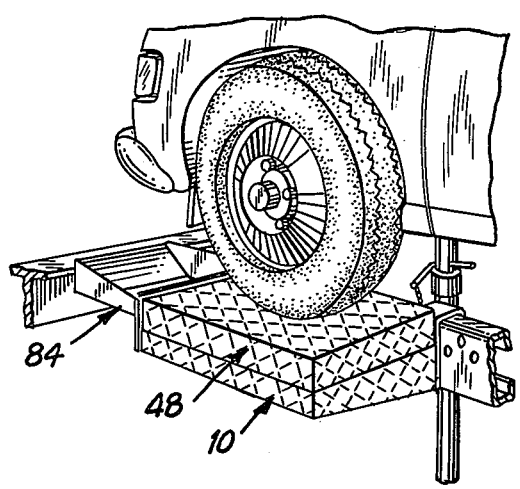
Figure 13:
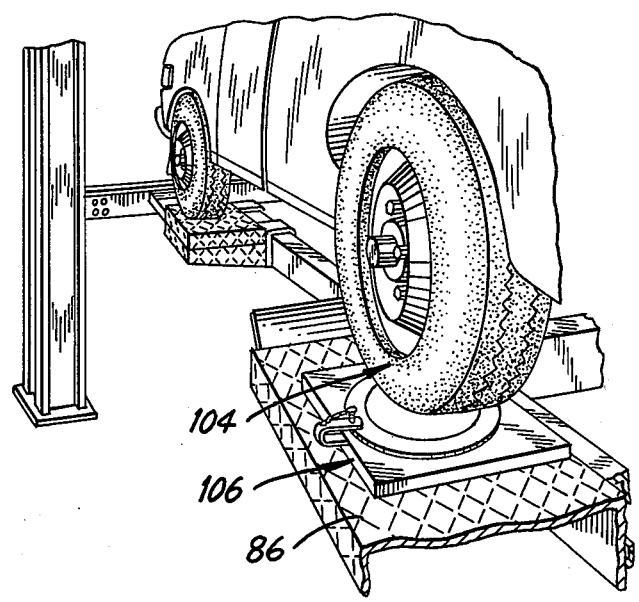
Figure 14:
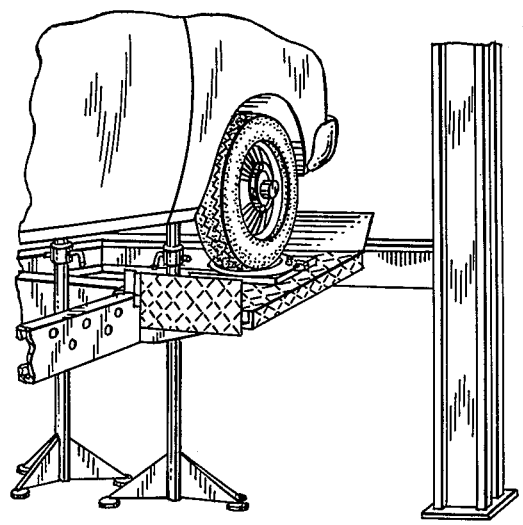

FIGS. 12 through 14 depict utilization of the wheel alignment apparatus of the invention with the universal bench where front wheel drive vehicles need to be serviced. Under this condition, the vehicle is backed up onto the frame of the bench with the rear wheels driven into the trough of the trolley. The front wheels continue to drive the vehicle completely onto the frame bed.

Once the vehicle is completely positioned on the frame bed the rear of the vehicle is jacked-up, the trolley 54 moved out from under the rear wheels and the composite, base plate and adapter plate 10 and 48 placed under the rear wheels. The base and adapter plates are secured to the longitudinally extending members of the frame bed. The car is then eased down on the frame bed by the tower arrangement 80 until the rear wheels contact the top surface of the adapter plate.

Thereafter, the front wheels of the vehicle 104 are raised above the bed plate 86 and the front wheel alignment tool 106 positioned under the tires. The front of the vehicle is lowered so that the front wheels contact the top surface area of the alignment tool.

As before, the height, 56, of the adapter plate 48 (see FIG. 4) is such that its position on the base plate will insure a coarse leveling between the front and rear wheels. Fine adjustment of the level between the two, again, is accomplished by adjusting the leveling screw in much the same way as described in association with FIG. 10.

Although the present invention has been described wherein the Paulee Universal Bench has been employed, it should be obvious that the principles of the present invention can be readily applied to similar frame bed benches. Other modifications to the described embodiment can obviously be made without deviating from the invention as disclosed in the appended claims.

What is claimed is:

1. An improved wheel alignment system including a frame bed having a pair of longitudinally extending members, means for positioning a vehicle on and off the frame bed, two bed plates, each including a top surface upon which the drive wheels of the vehicle come to rest, and two wheel alignment tools, said system further characterized by:
 (a) two base plates;
 (b) means for suspending each of said base plates from a corresponding one of the longitudinally extending members, said means for suspending having a pre-determined design, such that the top surfaces of each said base plate are located at a prescribed distance below the plane of the top surface of the bed plates, each said base plate having a respective wheel alignment tool disposed thereon, positionable beneath a respective one of the free wheels of the vehicle when said vehicle is a rear wheel drive vehicle, said prescribed distance such that the top surface of each said wheel alignment tool positioned on a respective base plate is approximately level with the top surface of the bed plates; and
 (c) two adapter plates, each of said adapter plates removably disposable on a respective base plate, each said adapter plate disposed on a respective base plate when the vehicle is a front wheel drive vehicle, the composite of the adapter plate—base plate positionable under the free wheels of the vehicle when the vehicle is a front wheel drive, each wheel alignment tool removably disposable on a respective bed plate and positionable under a respective drive wheel of the vehicle when the vehicle is a front wheel drive, said adapter plates having a prescribed height such that the top surface of each said adapter plate when disposed on a respective base plate is approximately level with the top surface of the wheel alignment tool disposed on a bed plate.

2. The system claimed in claim 1 wherein said means for suspending include means for varying the level of the top surface of a respective base plate and/or adpater plate composite.

3. The system claimed in claim 2 wherein said means for suspending comprise at least one flange member fixedly connected to the base plate, said flange member co-acting with a longitudinally extending member of the frame bed to suspend a respective base plate therefrom.

* * * * *